United States Patent
Shimauchi

(10) Patent No.: US 11,458,810 B2
(45) Date of Patent: Oct. 4, 2022

(54) AIR-CONDITIONING DEVICE FOR VEHICLE

(71) Applicant: TOYOTA JIDOSHA KABUSHIKI KAISHA, Toyota (JP)

(72) Inventor: Takayuki Shimauchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 331 days.

(21) Appl. No.: 15/387,033

(22) Filed: Dec. 21, 2016

(65) Prior Publication Data
US 2017/0174045 A1 Jun. 22, 2017

(30) Foreign Application Priority Data
Dec. 22, 2015 (JP) .............................. JP2015-250265

(51) Int. Cl.
| | |
|---|---|
| *B60H 1/00* | (2006.01) |
| *B60H 1/32* | (2006.01) |
| *B60H 1/03* | (2006.01) |
| *B60H 1/04* | (2006.01) |
| *B60H 1/12* | (2006.01) |

(52) U.S. Cl.
CPC ..... *B60H 1/00885* (2013.01); *B60H 1/00064* (2013.01); *B60H 1/0075* (2013.01);
(Continued)

(58) Field of Classification Search
CPC ........ B60H 1/00885; B60H 2001/3272; B60H 2001/3283
See application file for complete search history.

(56) References Cited

U.S. PATENT DOCUMENTS 5,743,099 A * 4/1998 Kraynak .............. B60H 1/3208
165/204
5,960,858 A * 10/1999 Hildebrand ........ B60H 1/00878
165/42
(Continued)

FOREIGN PATENT DOCUMENTS

| JP | 57-99409 A | 6/1982 |
|---|---|---|
| JP | 6-171339 | 6/1994 |

(Continued)

OTHER PUBLICATIONS

Extended European Search Report dated May 19, 2017 in Patent Application No. 16206502.3.

*Primary Examiner* — Leonard R Leo
(74) *Attorney, Agent, or Firm* — Oblon, McClelland, Maier & Neustadt, L.L.P.

(57) ABSTRACT

Provided is an air-conditioning device for a vehicle, including: a cooling device configured to cool air passing through a duct; a heater core, which is arranged in the duct on a downstream side of airflow with respect to the cooling device, and is configured to use an engine coolant as a heat source to heat the air; a water valve provided in a coolant circulation system on an upstream side of the heater core; and a controller configured to control those components, in which the controller is configured to decrease an opening amount of the water valve in a predetermined cooling mode. The control is configured to, when the opening amount of the water valve is decreased, decrease a rotational speed of a compressor of the cooling device, and increase a target evaporator temperature of an evaporator of the cooling device, thereby decreasing cooling performance of the cooling device.

6 Claims, 7 Drawing Sheets

(52) U.S. Cl.
CPC ..... *B60H 1/00792* (2013.01); *B60H 1/00807* (2013.01); *B60H 1/00828* (2013.01); *B60H 1/00842* (2013.01); *B60H 1/00849* (2013.01); *B60H 1/00864* (2013.01); *B60H 1/00964* (2013.01); *B60H 1/034* (2013.01); *B60H 1/04* (2013.01); *B60H 1/12* (2013.01); *B60H 1/3208* (2013.01); *B60H 2001/3272* (2013.01); *B60H 2001/3283* (2013.01); *B60H 2001/3292* (2013.01)

(56) References Cited

U.S. PATENT DOCUMENTS

| | | | | |
|---|---|---|---|---|
| 10,252,600 | B2* | 4/2019 | Miyakoshi | F25B 49/02 |
| 10,421,338 | B2* | 9/2019 | Suzuki | F25B 49/02 |
| 10,427,495 | B2* | 10/2019 | Suzuki | B60H 1/008 |
| 2007/0000265 | A1* | 1/2007 | McEnaney | F25B 49/025 |
| | | | | 62/228.4 |
| 2013/0160986 | A1 | 6/2013 | Hashigaya et al. | |

FOREIGN PATENT DOCUMENTS

| | | |
|---|---|---|
| JP | 2010-168021 | 8/2010 |
| JP | 2011-246083 | 12/2011 |
| JP | 2013-95347 | 5/2013 |
| JP | 2013-166468 | 8/2013 |
| JP | 2014-28532 | 2/2014 |
| JP | 2015-196450 | 11/2015 |
| JP | 2017-19451 A | 1/2017 |

* cited by examiner

AIR-CONDITIONING DEVICE FOR VEHICLE

CROSS-REFERENCE TO RELATED APPLICATIONS

The disclosure of Japanese Patent Application No. JP 2015-250265 filed on Dec. 22, 2015 is incorporated herein by reference in its entirety.

BACKGROUND

1. Technical Field

The present disclosure relates to an air-conditioning device for a vehicle, e.g., a motor vehicle.

2. Description of the Related Art

The air-conditioning device for a vehicle includes a duct for feeding air to a vehicle cabin, a blower arranged in the duct for generating airflow toward a vehicle cabin, and a cooling device for cooling the air passing through the duct. Further, the air-conditioning device includes a heater core, an air mix dumper, a water valve, and an air-conditioning control device. The air-conditioning control device is configured to control the cooling device, the air-mix damper, the water valve, and the like.

The heater core is arranged in the duct on a downstream side of the airflow with respect to an evaporator of the cooling device, and is configured to use an engine coolant supplied by a coolant circulation system as a heat source to heat the passing air. The air mix damper is arranged on an upstream side of the airflow with respect to the heater core in the duct, and is configured to change a ratio between an air amount passing through the heater core and an air amount bypassing the heater core by changing its opening degree. The water valve is provided in the coolant circulation system on an upstream side with respect to the heater core in terms of a flow of the engine coolant, and is configured to decrease an opening amount depending on necessity, thereby decreasing a flow amount of the coolant supplied to the heater core, or stopping the flow of the coolant.

When the airflow to the heater core is blocked by the air mix damper, heat exchange between the heater core and the airflow is no longer carried out, and supply of thermal energy to the heater core by the engine coolant thus becomes unnecessary. Thus, in Abstract of Japanese Patent Application Laid-open No. Hei 6-171339, for example, there is disclosed stopping of circulatory supply of an engine coolant to a heater core by closing a water valve when airflow to the heater core is blocked by an air mix damper during the maximum cooling operation.

When the circulatory supply of the engine coolant to the heater core is stopped by closing the water valve, the thermal energy is not supplied from the engine coolant to the heater core, resulting in excessive cooling performance of the cooling device directed to the airflow flowing through the duct. In other words, when the cooling device is operated in the state where the water valve is closed as in the case where the water valve is opened, the airflow is excessively cooled, and at the same time, energy is unnecessarily consumed by the operation of the cooling device, resulting in degradation of fuel consumption.

However, how to control the cooling device when the water valve is closed is not disclosed in Japanese Patent Application Laid-open No. Hei 6-171339. Moreover, Japanese Patent Application Laid-open No. Hei 6-171339 does not also disclose how to control the cooling device when the opening amount of the water valve is decreased and the supply amount of the thermal energy from the engine coolant to the heater core is thus decreased.

SUMMARY

It is a primary object of the present disclosure to save the energy consumed by the operation of a cooling device in the case where the opening amount of a water valve is decreased compared with the case where the opening amount of the water valve is not decreased in an air-conditioning device for a vehicle, thereby decreasing the fuel consumption of the vehicle.

According to one embodiment of the present disclosure, there is provided an air-conditioning device for a vehicle, including: a duct configured to feed air to a vehicle cabin; a blower, which is arranged in the duct, and is configured to generate airflow toward the vehicle cabin; a cooling device configured to cool air passing through the duct; a heater core, which is arranged in the duct on a downstream side of the airflow with respect to the cooling device, and is configured to use an engine coolant supplied by a coolant circulation system as a heat source to heat the passing air; an air mix damper configured to change a ratio between an air amount passing through the heater core and an air amount bypassing the heater core; a water valve, which is provided in the coolant circulation system on an upstream side of the heater core, and is capable of changing an opening amount; and a control device configured to control the blower, the cooling device, the air mix damper, and the water valve, in which: the control device is configured to decrease the opening amount of the water valve in a predetermined cooling mode.

The control device is configured to decrease cooling performance of the cooling device in a case where the opening amount of the water valve is decreased compared with a case where the opening amount of the water valve is not decreased.

As described later in detail, the cooling device includes an electric compressor configured to compress refrigerant to discharge the compressed refrigerant, an evaporator configured to evaporate the refrigerant sucked into the electric compressor, and a condenser configured to condense the refrigerant evaporated by the evaporator. The evaporator is arranged in the duct on a downstream side of the airflow with respect to the blower. The evaporator is configured to evaporate the refrigerant, which has been expanded by the expansion valve after compression by the compressor, and carry out heat exchange between the refrigerant decreased in temperature by heat of evaporation and air passing through the evaporator, thereby cooling the air. Thus, the cooling performance of the cooling device can be decreased as a result of a decrease in a circulation flow amount of the refrigerant in the cooling device.

With the above-mentioned configuration, the cooling performance of the cooling device is decreased in the case where the opening amount of the water valve is decreased compared with the case where the opening amount of the water valve is not decreased, and the circulation flow amount of the refrigerant can thus be decreased in the cooling device. The decrease in the circulation flow amount of the refrigerant decreases a load imposed on the compressor, and the energy consumed by the operation of the compressor can be saved, thereby decreasing the fuel consumption of the vehicle.

The opening amount of the water valve is decreased in a predetermined cooling mode, and the opening amount of the water valve is not decreased in a state other than the predetermined cooling mode, and the opening amount of the water valve is thus not unnecessarily decreased. Thus, the consumed energy can be decreased and the fuel consumption can be decreased without decreasing air-conditioning performance of the air-conditioning device. Further, a decrease amount of the cooling performance of the cooling device preferably corresponds to a decrease amount of the opening amount of the water valve.

In one aspect of the present disclosure, the cooling device includes: an electric compressor configured to compress a refrigerant to discharge the compressed refrigerant; an evaporator, which is arranged in the duct on a downstream side of the airflow with respect to the blower, and is configured to evaporate the refrigerant sucked into the electric compressor; and a condenser configured to condense the refrigerant evaporated by the evaporator. The control device is configured to control the electric compressor and the condenser so that a temperature of the evaporator reaches a target temperature. The control device is configured to decrease the cooling performance of the cooling device through at least one of an increase in the target temperature, or a decrease in an upper limit rotational speed of the electric compressor, when the opening amount of the water valve is decreased.

The rotational speed of the electric compressor required to cause the temperature of the evaporator to reach the target temperature can be decreased by increasing the target temperature. Moreover, the maximum rotational speed of the electric compressor can be decreased by decreasing the upper limit rotational speed of the electric compressor. With the above-mentioned aspect, the cooling performance of the cooling device is decreased by at least one of the increase in the target temperature or the decrease in the upper limit rotational speed of the electric compressor when the opening amount of the water valve is decreased. Thus, the energy consumed by the operation of the compressor can be decreased, thereby decreasing the fuel consumption of the vehicle compared with a case where any one of the increase in the target temperature and the decrease in the upper limit rotational speed of the electric compressor is not carried out.

DETAILED DESCRIPTION

Now, an embodiment of the present disclosure is described in detail with reference to the accompanying drawings.

Figure 1:
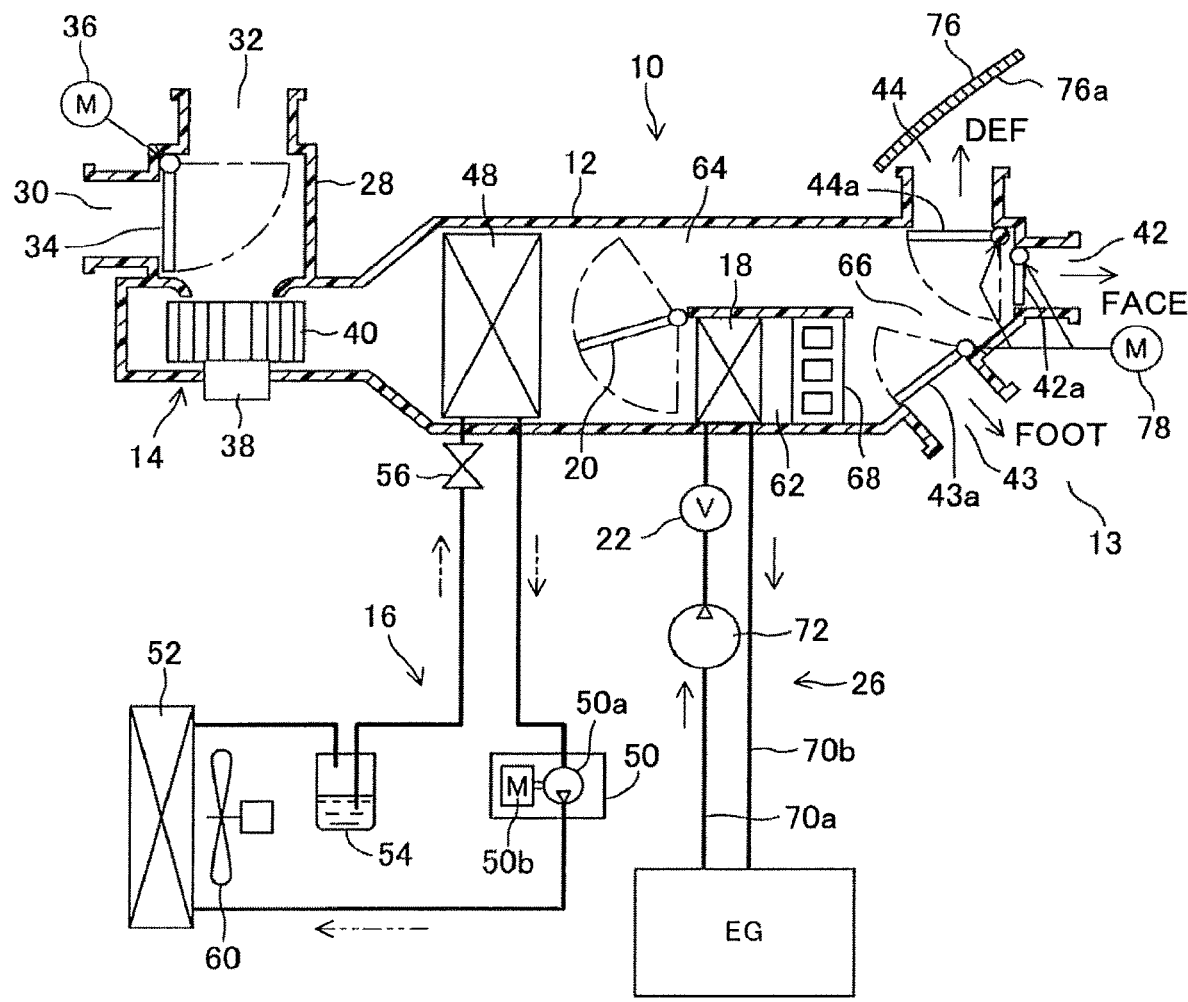
FIG. 1 is a schematic configuration diagram for illustrating a vehicle air-conditioning device according to an embodiment of the present disclosure.
Figure 2:
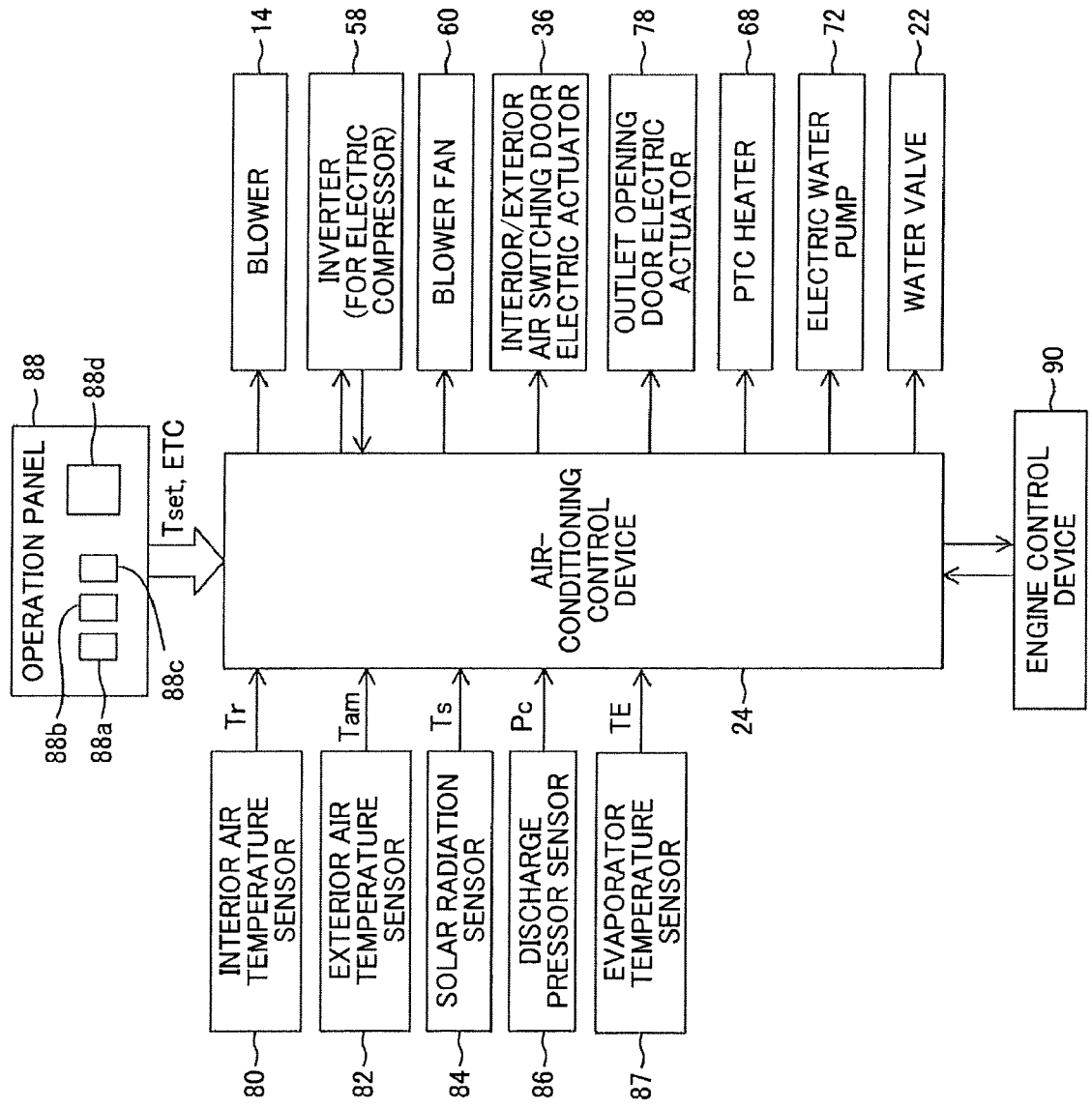
FIG. 2 is a block diagram for illustrating a control system according to the embodiment.

FIG. 1 is a schematic configuration diagram for illustrating a vehicle air-conditioning device 10 according to an embodiment of the present disclosure. The air-conditioning device 10 includes a duct 12 for feeding air to a vehicle cabin, a blower 14 arranged in the duct 12 for generating airflow toward the vehicle cabin 13, and a cooling device 16 for cooling the air passing through the duct 12. Further, the air-conditioning device 10 includes a heater core 18, an air mix dumper 20, a water valve 22, and an air-conditioning control device 24 (FIG. 2). The air-conditioning control device 24 is configured to control the blower 14, the cooling device 16, the air mix damper 20, the water valve 22, and the like as described later in detail.

The heater core 18 is arranged in the duct 12 on a downstream side of the airflow with respect to an evaporator 48 of the cooling device 16, and is configured to use an engine coolant supplied by a coolant circulation system 26 as a heat source for heating the passing air. The air mix damper 20 is arranged on an upstream side of the airflow with respect to the heater core 18 in the duct 12, and is configured to change a ratio between an air amount passing through the heater core 18 and an air amount bypassing the heater core 18 by changing its opening degree. The water valve 22 is provided in the coolant circulation system 26 on an upstream side with respect to the heater core 18 in terms of a flow of the coolant indicated by the solid arrows in FIG. 1, and is configured to decrease an opening amount depending on necessity, thereby decreasing a flow amount of the coolant supplied to the heater core 18, or stopping the flow of the coolant.

The duct 12 includes an interior/exterior air switching box 28 on an upstream side of the airflow with respect to the blower 14 for switching the air to be introduced into the duct 12 between interior air (air in the vehicle cabin 13) and exterior air (air outside the vehicle cabin 13). An interior air introduction opening 30 for introducing the interior air into the duct 12 and an exterior air introduction opening 32 for introducing the exterior air are provided for the interior/exterior air switching box 28. Further, an interior/exterior air switching door 34 is arranged inside the interior/exterior air switching box 28, which is for continuously adjusting opening areas of the interior air introduction opening 30 and the exterior air introduction opening 32 simultaneously, thereby changing an exterior air introduction ratio, which is an air amount ratio of the exterior air to the entire air to be introduced into the duct 12 from the interior air introduction opening 30 and the exterior air introduction opening 32. The interior/exterior air switching door 34 is driven by an electric actuator 36. The electric actuator 36 is controlled by the air-conditioning control device 24.

An introduction mode of the interior/exterior air by the interior/exterior air switching box 28 is also referred to as inlet opening mode. The inlet opening mode includes an interior air mode, an exterior air mode, and a semi-interior air mode. In the interior air mode, when the interior air introduction opening 30 is fully opened, the exterior air introduction opening 32 is fully closed, and the interior air is thus introduced into the duct 12. In the exterior air mode, when the interior air introduction opening 30 is fully closed, and the exterior air introduction opening 32 is fully opened, and the exterior air is thus introduced into the duct 12. Further, in the semi-interior air mode, the opening areas of the interior air introduction opening 30 and the exterior air introduction opening 32 are approximately the same, and the exterior air and the interior air are introduced at the same air amount ratio into the duct 12.

The blower 14 is an electric air delivery device including a blower motor 38 and a centrifugal multi-wing fan (sirocco fan) 40, and the centrifugal multi-wing fan 40 is driven by the blower motor 38. The blower 14 is configured to blow air-conditioned air whose temperature is adjusted from air outlet openings 42 to 44 formed on the duct 12 into the vehicle cabin 13. A rotational speed, namely, an air delivery amount of the blower motor 38 is controlled by the air-conditioning control device 24.

The cooling device 16 includes, for example, an evaporator 48, a compressor 50, a condenser 52, a gas-liquid separator 54, and an expansion valve 56. The evaporator 48 is arranged on a downstream side of the airflow with respect to the blower 14. The evaporator 48 is configured to evaporate the refrigerant, which has been expanded by the expansion valve 56 after compression by the compressor 50, and carry out heat exchange between the refrigerant decreased in temperature by heat of evaporation and air passing through the evaporator 48, thereby cooling the air. In FIG. 1, the long dashed short dashed arrow represents a flow of the liquid refrigerant, and the long dashed double-short dashed arrow represents a flow of the gas refrigerant.

The compressor 50 is arranged in an engine room (not shown) and is configured to suck and then compress the gas refrigerant, and discharge the refrigerant at a high pressure. The compressor 50 may be an electric compressor in which a fixed displacement type compression mechanism 50*a* whose discharge volume is fixed is driven by an electric motor 50*b*. The electric motor 50*b* is an AC motor whose rotational speed is controlled by an AC voltage output from an inverter 58 (refer to FIG. 2). The inverter 58 is controlled by the air-conditioning control device 24.

The condenser 52 is also arranged in the engine room, and is configured to carry out heat exchange between the refrigerant circulating inside and the exterior air delivered by a blower fan 60 serving as an exterior blower, thereby liquefying the compressed refrigerant through condensation. The blower fan 60 is an electric blower whose availability, namely, a rotational speed (air delivery amount) is controlled by a control voltage output from the air-conditioning control device 24.

The air/liquid separator 54 is configured to apply air/liquid separation to the refrigerant liquefied by the condensation, and cause only the liquid refrigerant to flow to the expansion valve 56. The expansion valve 56 is a decompressing device for decompressing the liquid refrigerant to expand the refrigerant, and is configured to supply the decompressed and expanded refrigerant to the evaporator 48.

A heating passage 62 and a cool air bypass passage 64 for causing the air having passed through the evaporator 48 to flow, and a mixing space 66 for mixing the air having passed those passages are formed on the downstream side of the airflow with respect to the evaporator 48 in the duct 12. A heater core 18 and a PTC heater 68 serving as a heating device for heating the air that has passed through the evaporator 48, in other words, the air that has been cooled by the evaporator 48 are arranged in this sequence along the direction of the flow of the air in the heating passage 62.

The heater core 18 is a heat exchanger for heating the air that has passed through the evaporator 48 through heat exchange between a coolant (hot coolant) of an engine EG for outputting a driving force for vehicle travel and the air that has passed through the evaporator 48. Specifically, a coolant flow passage for supply 70*a* and a coolant flow passage for return 70*b* connect the heater core 18 and the engine EG to each other. The electric water pump 72 and the water valve 22 are provided in the coolant flow passage for supply 70*a*. The coolant flow passages 70*a* and 70*b*, the electric water pump 72, and the water valve 22 cooperate with, for example, a coolant passage (not shown) in the engine EG, thereby forming the coolant circulation system 26 for circulating the coolant between the heater core 18 and the engine EG.

The electric water pump 72 is an electric water pump whose rotational speed (circulation flow amount of the coolant) is controlled by a control voltage output from the air-conditioning control device 24. The water valve 22 is an electromagnetic valve for normally maintaining an open state, and an opening amount is controlled by a control current output from the air-conditioning control device 24. When the opening amount of the water valve 22 is decreased, a flow amount of the coolant to the heater core 18 is thus decreased, and thermal energy supplied to the heater core 18 is decreased. When the water valve 22 is to be closed in the state where the electric water pump 72 is driven, the electric water pump 72 is stopped when the water valve 22 is closed.

Moreover, the PTC heater 68 includes a plurality of PTC devices (positive temperature coefficient thermistor devices), and is an electric heater for functioning as auxiliary heating means for generating heat as a result of supply of electric power to the PTC devices, thereby heating the air passing through the heater core 18. The air-conditioning control device 24 is configured to change the number of PTC devices to which the current is supplied through switching or the like, thereby controlling a heating performance of the entire PTC heater 68.

The cool air bypass passage 64 is an air passage configured to lead the air that has passed through the evaporator 48 to the mixing space 66 without passing through the heater core 18 and the PTC heater 68. Thus, the temperature of the air mixed in the mixing space 66 changes depending on the air amount ratio between the air passing through the heating passage 62 and the air passing through the cool air bypass passage 64.

The air mix damper 20 is provided on an inlet side of the heating passage 62 and the cool air bypass passage 64, and is configured to continuously change the air amount ratio between the cool air flowing into the heating passage 62 and the cool air flowing into the cool air bypass passage 64. The air mix damper 20 is driven by an electric actuator, which is not shown in FIG. 1, and this electric actuator is controlled by a control signal output from the air-conditioning control device 24. The air mix damper 20 functions as a temperature adjustment device for adjusting the temperature (temperature of the delivered air supplied to the vehicle cabin 13) of the air in the mixing space 66.

The air outlet openings 42 to 44 are positioned at a most downstream portion of the airflow flowing through the duct 12, and are configured to blow out the delivered air whose temperature is adjusted from the mixing space 66 to the vehicle cabin 13, which is a space to be air conditioned. The air outlet opening 42 is a face outlet opening for blowing out the air-conditioned air to an upper body of a passenger (not shown) in the vehicle cabin 13. The air outlet opening 43 is a foot outlet opening for blowing out the air-conditioned air to the feet of the passenger. The air outlet opening 44 is a defroster outlet opening for blowing out the air-conditioned air to an inner surface 76a of a front windshield 76.

A face door 42a for adjusting an opening area of the air outlet opening 42, a foot door 43a for adjusting an opening area of the air outlet opening 43, and a defroster door 44a for adjusting an opening area of the air outlet opening 44 are respectively arranged on an upstream side of the airflow with respect to the air outlet openings 42 to 44. The face door 42a, the foot door 43a, and the defroster door 44a are coupled to an electric actuator 78 for door drive via a link mechanism (not shown), and are driven pivotally in cooperation with one another. The electric actuator 78 is also controlled by a control signal output from the air-conditioning control device 24. The air outlet openings 42 to 44 and the electric actuator 78 function as outlet opening adjustment devices for respectively adjusting the opening areas of the respective air outlet openings 42 to 44.

Various outlet opening modes can be set through settings of the air outlet openings 42 to 44. The outlet opening modes available for the setting include a face mode (FACE), bi-level mode (B/L), a foot mode (FOOT), a defroster mode (DEF), and a foot/defroster mode (F/D).

The face mode is a mode for fully opening the face outlet opening 42, thereby blowing out the air from the face outlet opening 42 toward the upper body of the passenger in the vehicle cabin 13. The bi-level mode is a mode for opening both of the face outlet opening 42 and the foot outlet opening 43, thereby blowing out the air toward the upper body and the feet of the passenger in the vehicle cabin 13. The foot mode is a mode for fully opening the foot outlet opening 43, and opening the defroster outlet opening 44 at a small opening degree, thereby blowing out the air mainly from the foot outlet opening 43. The defroster mode is a mode for fully opening the defroster outlet opening 44, thereby blowing out the air from the defroster outlet opening 44. The foot/defroster mode is a mode for opening the foot outlet opening 43 and the defroster outlet opening 44 at approximately the same opening degree, thereby blowing out the air from both of the foot outlet opening 43 and the defroster opening 44.

With reference to FIG. 2, a description is now given of a control system according to the embodiment. The air-conditioning control device 24 is constructed by a widely known microcomputer including a CPU, a ROM, and a RAM, and a peripheral circuit thereof, and is configured to carry out various types of calculation and processing based on an air-conditioning program stored in the ROM described later, thereby controlling operations of various devices connected to an output side.

As illustrated in FIG. 2, the blower 14, the inverter 58 for the electric motor 50b of the compressor 50, the blower fan 60 as an exterior fan, the electric actuator 36 for the interior/exterior air switching door 34, the electric actuator 78 for the doors (outlet opening doors) 42a, 43a, and 44a for switching the outlet opening mode, the PTC heater 68, the electric water pump 72, the water valve 22, and the like are connected to the output side of the air-conditioning control device 24.

An interior air temperature sensor 80 for detecting a vehicle cabin temperature Tr, which is the temperature inside the vehicle cabin 13, an exterior temperature sensor 82 for detecting an exterior temperature Tam, and a solar radiation sensor 84 for detecting a solar radiation amount Ts inside the vehicle cabin 13 are connected to the input side of the air-conditioning control device 24. Moreover, a group of sensors, e.g., a discharge pressure sensor 86 for detecting a discharged refrigerant pressure Pc of the compressor 50 and an evaporator temperature sensor 87 for detecting an outlet air temperature (evaporator temperature) TE from the evaporator 48 are connected to the input side of the air-conditioning control device 24.

Moreover, in addition to the group of sensors illustrated in FIG. 2, a group of sensors including a discharge temperature sensor for detecting a discharge coolant temperature Tc of the compressor 50, an intake temperature sensor for detecting a temperature Tsi of the refrigerant sucked into the compressor 50, and a coolant temperature sensor for detecting a coolant temperature Tw of the engine coolant flowing out from the engine EG are also connected to the input side of the air-conditioning control device 24. The evaporator temperature sensor 87 is specifically configured to detect a heat exchange fin temperature of the evaporator 48, but may be configured to detect the temperature of another portion of the evaporator 48, or may be configured to directly detect the temperature of the refrigerant itself passing through the evaporator 48.

Further, operation signals are input from various air-conditioning operation switches provided on an operation panel 88 arranged near an instrument panel (not shown) at a front portion of the vehicle cabin 13 to the input side of the air-conditioning control device 24, and the various air-conditioning operation switches are operated by the passenger.

Specifically, an operation switch (not shown) for the air-conditioning device 10, an air-conditioner switch 88a for turning on/off the air conditioner (specifically, turning on/off of the compressor 50), an auto switch 88b, and a switch (not shown) for switching the operation mode are provided as the various air-conditioning operation switches on the operation panel 88. Further, an inlet opening mode switch 88c for switching the inlet opening mode, an outlet opening mode switch (not shown) for switching the outlet opening mode, an air amount setting switch (not shown) for the blower 14, a vehicle cabin temperature setting switch (not shown) for setting a target temperature Tset in the vehicle cabin 13, and the like are provided on the operation panel 88. The auto switch 88b is a switch used to set or reset automatic control for the air-conditioning device 10.

As illustrated in FIG. 2, a display part 88d for displaying the operation state of the air-conditioning device 10 is provided on the operation panel 88. The inlet opening mode selected by the inlet opening mode switch 88c and the like are displayed on the display part 88d.

Further, as shown in FIG. 2, the air-conditioning control device 24 is electrically connected to an engine control device 90 for communication, which is an engine computer for controlling the operation of the engine EG, and the air-conditioning control device 50 and the engine control device 90 are configured to transmit/receive required information to/from each other. Thus, based on a detection signal or an operation signal input to one of the control devices, another control device can control operations of various devices connected to an output side thereof.

For example, when the engine control device 90 determines that a decrease in a circulatory supply amount of the coolant to the heater core 18 or stop of the coolant is necessary, a signal for requiring the decrease in the opening amount of the water valve 22 or the closure of the water valve 22 is input from the engine control device 90 to the air-conditioning control device 24. When the air-conditioning control device 24 receives the signal for requiring the decrease in the opening amount of the water valve 22, the air-conditioning control device 24 decreases the opening amount of the water valve 22. When the air-conditioning control device 24 receives the signal for requiring the closure of the water valve 22, the air-conditioning control device 24 closes the water valve 22. Moreover, the air-conditioning control device 24 can change the operation of the engine EG by outputting a signal for requiring the operation of the engine EG to the engine control device 90. Further, when the engine EG is operating for the air conditioning, the air-conditioning control device 24 can stop the engine EG depending on necessity by avoiding outputting the signal for requiring the operation of the engine EG.

<Main Routine for Air-Conditioning Control>

Figure 3:
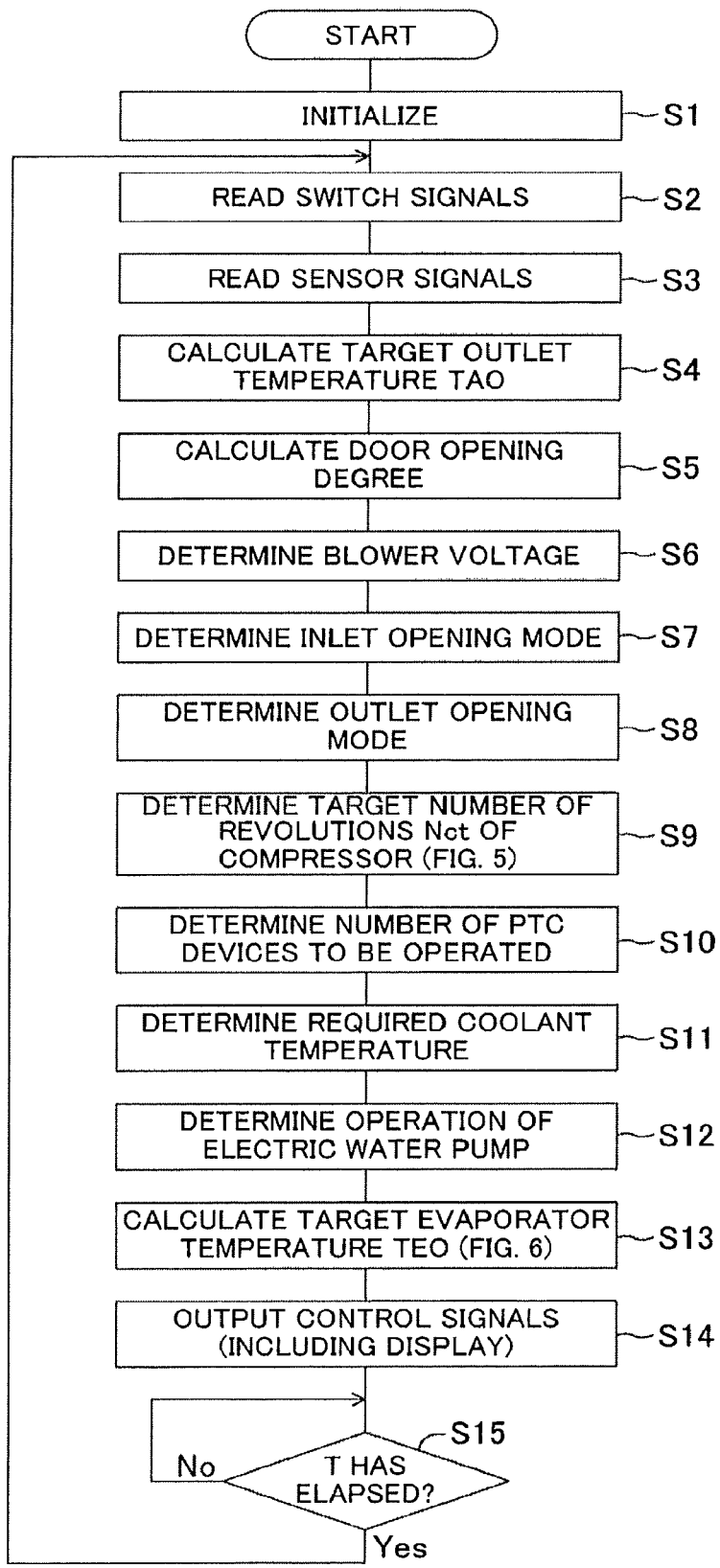
FIG. 3 is a flowchart for illustrating a main routine of air-conditioning control according to the embodiment.

Referring to a flowchart illustrated in FIG. 3, a description is now given of a main routine of the air-conditioning control by the air-conditioning control device 24. The control in accordance with the flowchart illustrated in FIG. 3 is repeated after each predetermined period when an ignition switch (not shown) is on.

In Step S1, stored contents of a memory for data processing built into the microcomputer in the air-conditioning control device 24 and the like are initialized. In Step S2, the operation signals (switch signals) of the operation panel 88 are read, and values represented by those signals are written in the memory for data processing. Specifically, signals, e.g., a signal representing the vehicle cabin target temperature Tset set by the vehicle cabin temperature setting switch, a signal representing a set position of the auto switch 88*b*, a signal representing a set position of the inlet opening mode switch 88*c*, and the like are read.

In Step S3, signals representing detected values are read from various sensors, and the respective detected values are written in the memory for data processing. Specifically, the interior temperature (vehicle cabin temperature) Tr detected by the interior air temperature sensor 80, the exterior temperature Tam detected by the exterior temperature sensor 82, the solar radiation amount Ts detected by the solar radiation sensor 84, the evaporator temperature TE detected by the evaporator temperature sensor 87, and an engine coolant temperature Tw detected by a coolant temperature sensor are read.

In Step S4, a target outlet temperature TAO is calculated by assigning data to Expression (1) stored in advance. In Expression (1), Tset is the set temperature set by the temperature setting switch, Tr is the interior temperature, Tam is the exterior temperature, and Ts is the solar radiation amount. Moreover, Kset, Kr, Kam, and Ks are gains of the respective parameters, and C is a constant for correction.

$$TAO = Kset \times Tset - Kr \times Tr - Kam \times Tam - Ks \times Ts + C \quad (1)$$

In Step S5, a control value for the actuator for the air mix damper 20, a control value for the number of revolutions of the electric water pump 72, and the like are calculated in a manner publicly known in the art based on the target outlet temperature TAO and the detected values of the various sensors.

In Step S6, a blower voltage, namely, a voltage applied to the blower motor 38 of the blower 14 is determined based on the target outlet temperature TAO, the signals from the various sensors, and the signal from the operation panel 88. The outlet air amount of the blower 14 changes in response to the blower voltage. The blower voltage may be determined in a manner as described, for example, in Japanese Patent Application Laid-open No. 2013-166468 and Japanese Patent Application Laid-open No. 2014-28532.

In Step S7, an inlet opening mode is determined based on the target outlet temperature TAO, the signal from the various sensors, and the signal from the operation panel 88. The inlet opening mode may be determined in a manner as described, for example, in Japanese Patent Application Laid-open No. 2015-196450.

In Step S8, as a result of the determination of the outlet opening mode based on the target outlet temperature TAO and the signal from the operation panel 88, the outlet opening from which the air-conditioned air is blown out to the vehicle cabin is determined. For example, when the auto switch 88*b* on the operation panel 88 is on, the outlet opening mode is determined to be any one of FACE, B/L, and FOOT in response to the target outlet temperature TAO in accordance with a control map stored in advance.

In Step S9, a target number of revolutions Nct (number of revolutions per unit period) for the compressor 50 is calculated in accordance with a target number of revolutions determination routine of the compressor 50 illustrated in FIG. 5 as described later in detail.

In Step S10, the number of PTC devices to be operated in the PTC heater 68 constructing the electric heater is determined. For example, the operating number of PTC devices is determined so as to increase as the engine coolant temperature Tw decreases in accordance with a control map stored in advance in a manner as described, for example, in Japanese Patent Application Laid-open No. 2013-166468 and Japanese Patent Application Laid-open No. 2014-28532.

In Step S11, a required coolant temperature of the engine coolant is determined based on the target outlet temperature TAO and the like in order to use the engine coolant as a heat source for warming, defogging, and the like in a manner as described, for example, in Japanese Patent Application Laid-open No. 2013-166468 and Japanese Patent Application Laid-open No. 2014-28532. Further, whether or not an engine-on requirement of requiring the engine control device 90 to start the engine EG is required is determined based on the required coolant temperature of the engine coolant.

In Step S12, whether the electric water pump 72 is to be turned on or off is determined based on the engine coolant temperature Tw and the like in a manner as described, for example, in Japanese Patent Application Laid-open No. 2013-166468 and Japanese Patent Application Laid-open No. 2014-28532.

In Step S13, a target evaporator temperature TEO, which is a target value of the evaporator temperature TE, is calculated in accordance with an evaporator temperature calculation routine illustrated in FIG. 6 as described later in detail.

In Step S14, in order to attain the respective control states calculated or determined in Steps S4 to S13, control signals are output to the corresponding actuators, the engine control device 90, and the like. Moreover, the control signals are output to the operation panel 88, and the display on the display part 88*d* of the operation panel 88 is thus switched.

In Step S15, whether or not a control cycle T has elapsed is determined. When a negative determination is made, Step S15 is executed repeatedly. When an affirmative determination is made, the control returns to Step S2. The cycle T of the control illustrated in FIG. 2 may be, for example, 250 milliseconds. This cycle is relatively long because the long control cycle for carrying out the air-conditioning control does not adversely affect controllability thereof compared with the engine control and the like. Thus, communication traffic for the air-conditioning control is suppressed, thereby being capable of sufficiently securing communication traffic for control systems requiring high speed control, e.g., the engine control.

<Control Routine for Opening Amount of Water Valve>

Figure 4:
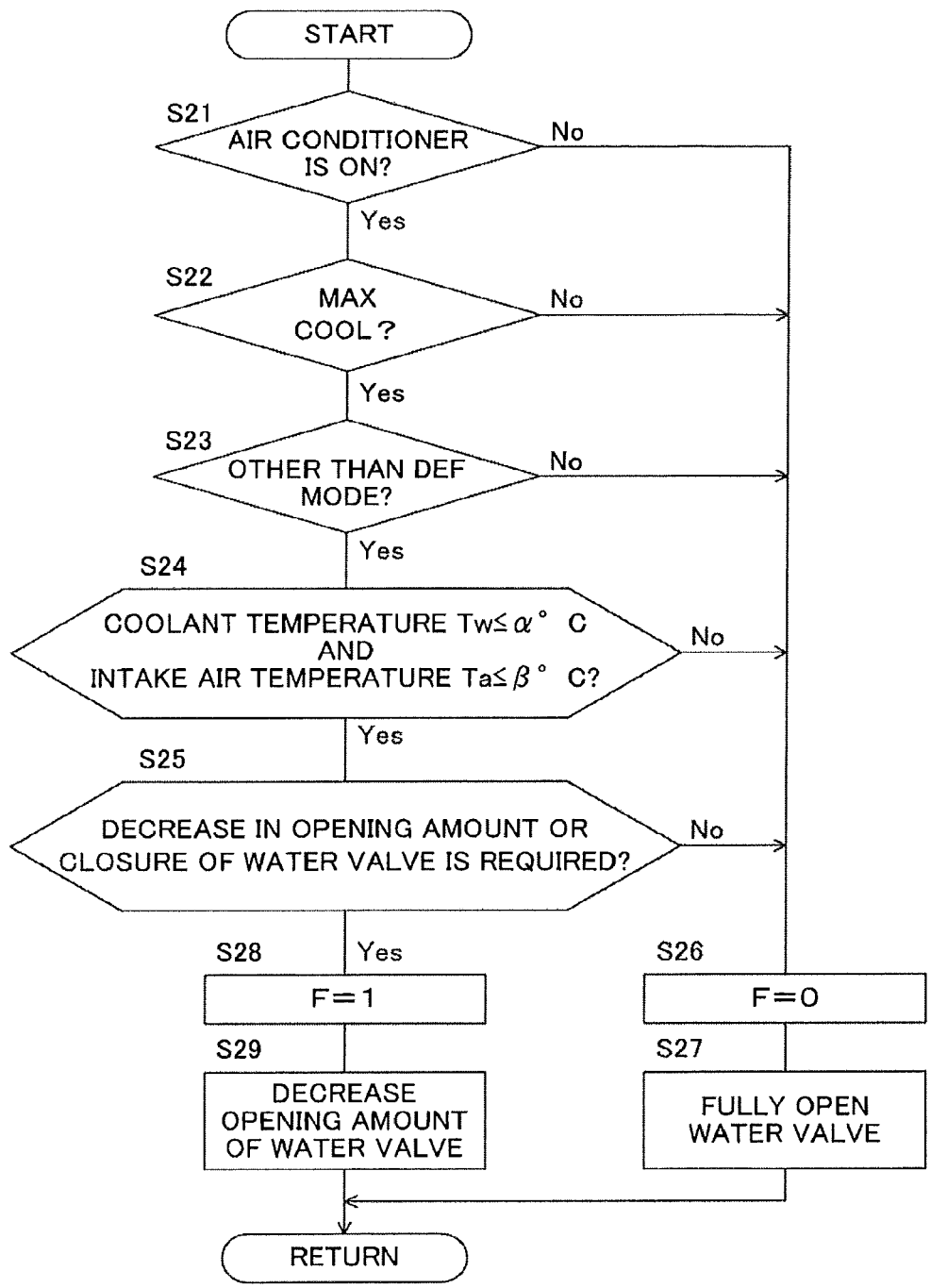
FIG. 4 is a flowchart for illustrating a control routine for an opening amount of a water valve according to the embodiment.

Referring to a flowchart illustrated in FIG. 4, a description is now given of a control routine for the opening amount of the water valve 22. The control in accordance with the flowchart illustrated in FIG. 4 is carried out through interruption after each predetermined period to the control in accordance with the flowchart illustrated in FIG. 3. In the following description, the control in accordance with the flowchart illustrated in FIG. 4 is referred to as control of the opening amount.

First, in Step S21, whether or not the air-conditioning switch 88a is on is determined. When a negative determination is made, the control of the opening amount proceeds to Step S26. When an affirmative determination is made, the control of the opening amount proceeds to Step S22.

In Step S22, whether or not the vehicle cabin temperature setting switch (not shown) is set to the minimum temperature (MAX COOL) of cooling is determined. When a negative determination is made, the control of the opening amount proceeds to Step S26. When an affirmative determination is made, the control of the opening amount proceeds to Step S23. This determination is made because heating of the air by using the heater core 18 is necessary when the vehicle cabin temperature setting switch is set to a temperature other than the minimum temperature of the cooling.

In Step S23, whether or not the outlet opening mode set by the outlet opening mode switch (not shown) is a mode other than the defroster mode (DEF mode) is determined. When a negative determination is made, the control of the opening amount proceeds to Step S26. When an affirmative determination is made, the control of the opening amount proceeds to Step S24. This determination is made because the air needs to be heated by using the heater core 18 in order to use warm airflow to defog the front windshield 76 when the outlet opening mode is the defroster mode.

In Step S24, whether or not the coolant temperature Tw is equal to or less than α (positive constant) ° C. and the intake air temperature Ta of the engine EG is equal to or less than β (positive constant) ° C. A signal representing the intake air temperature Ta is input from the engine control device 90 to the air-conditioning control device 24. When a negative determination is made, the control of the opening amount proceeds to Step S26. When an affirmative determination is made, the control of the opening amount proceeds to Step S25.

When the coolant temperature Tw is equal to or less than the reference coolant temperature and the intake air temperature Ta of the engine EG is equal to or less than the reference intake air temperature, a signal for requiring the decrease in the opening amount of the water valve 22 or the closure of the water valve 22 is output from the engine control device 90. Thus, this determination serves to check whether or not determination in Step S25 described later is valid.

In Step S25, whether or not the signal requiring for the decrease in the opening amount of the water valve 22 or the closure of the water valve 22 is input from the engine control device 90 is determined. When an affirmative determination is made, the control of the opening amount proceeds to Step S28. When a negative determination is made, the control of the opening amount proceeds to Step S26.

In Step S26, a flag F is rest to 0. In Step S27, the opening amount of the water valve 22 is controlled so as to be the maximum value. In other words, the water valve 22 is set to the fully open state.

In Step S28, the flag F is set to 1. In Step S29, the opening amount of the water valve 22 is decreased in response to the requirement input from the engine control device 90 (the decrease includes the full closure). The state where the flag F is 1 represents the state where the opening amount of the water valve 22 is decreased.

<Calculation Routine for Target Number of Revolutions of Compressor>

Figure 5:
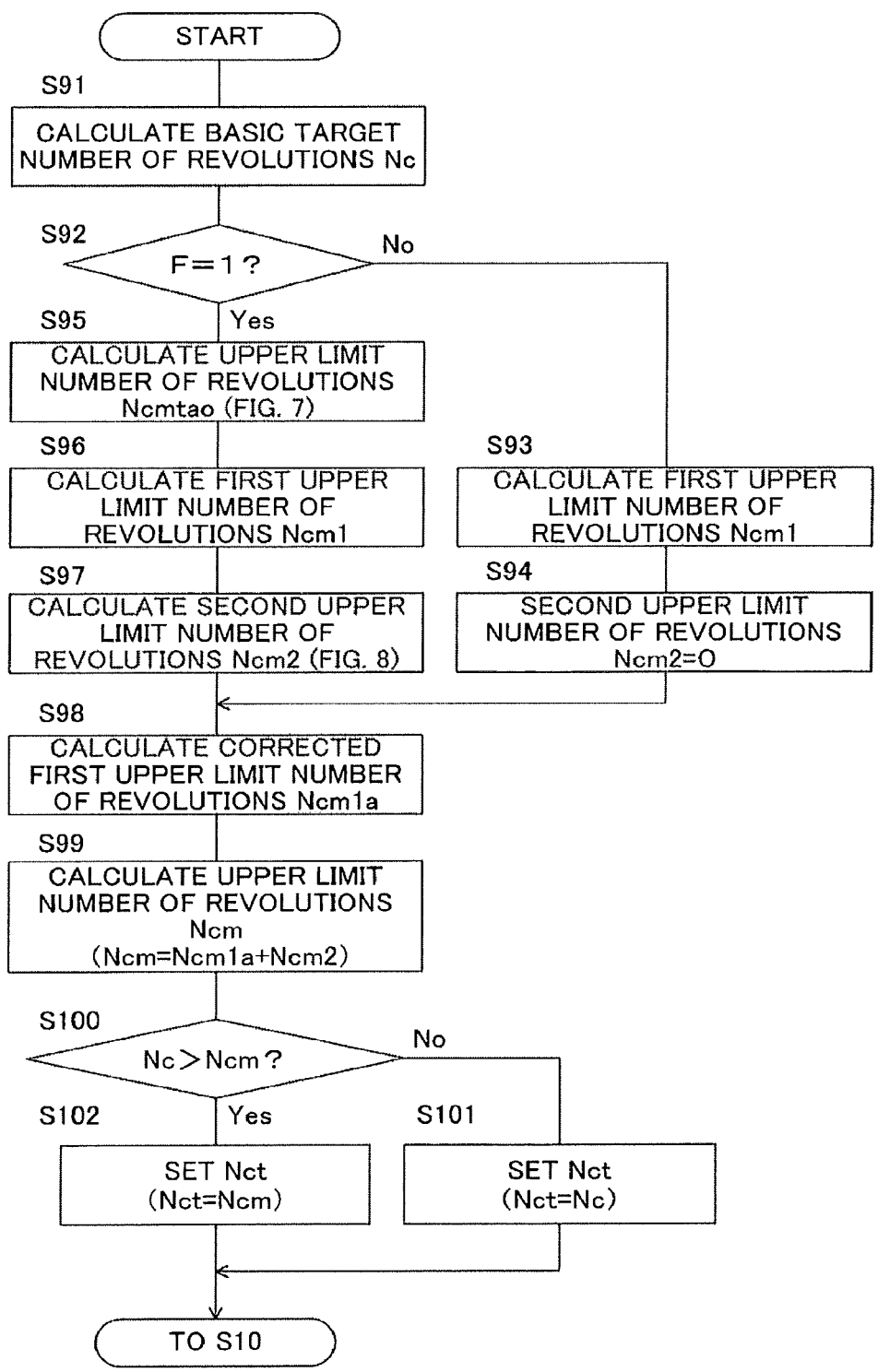
FIG. 5 is a flowchart for illustrating a target rotational speed determination routine for a compressor to be carried out in Step S9 of the flowchart illustrated in FIG. 3.

Referring to a flowchart illustrated in FIG. 5, a description is now given of a calculation routine for the target number of revolutions Nct of the compressor 50 executed in Step S9. In the following description, the control in accordance with the flowchart illustrated in FIG. 5 is referred to as calculation control for compressor target number of revolutions.

First, in Step S91, a basic target number of revolutions Nc of the compressor 50 is calculated based on, for example, a deviation En (=TEO−TE) between the target evaporator temperature TEO calculated in Step S13 and the outlet air temperature TE. The calculation of the basic target number of revolutions Nc may be carried out in the same manner as, for example, calculation of a target number of revolutions described in Japanese Patent Application Laid-open No. 2013-166468.

In Step S92, a determination of whether or not the flag F is 1, namely, a determination of whether or not the opening amount of the water valve 22 is decreased is made. When an affirmative determination is made, the calculation control for compressor target number of revolutions proceeds to Step S95. When a negative determination is made, the calculation control for compressor target number of revolutions proceeds to Step S93.

In Step S93, the minimum value out of a target number of revolutions Ncb1 of the compressor 50 determined by the exterior temperature Tam and a thermal load imposed on the air-conditioning device 10, a target number of revolutions Ncb2 of the compressor 50 determined based on the flow amount of the air delivered by the blower 14, and a target number of revolutions Ncb3 determined by a specification of the compressor 50 is calculated as a first upper limit number of revolutions Ncm1 of the compressor 50. In Step S94, a second upper limit number of revolutions Ncm2 of the compressor 50 is set to 0.

Figure 7:
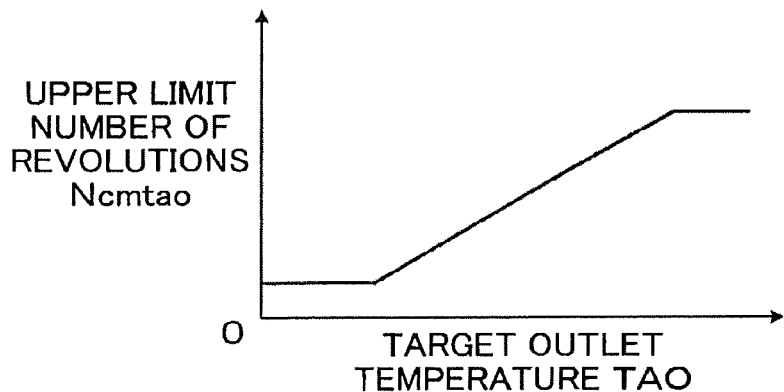
FIG. 7 is a map to be used to calculate an upper limit number of revolutions Ncmtao of the compressor based on a target outlet temperature TAO.

In Step S95, a map illustrated in FIG. 7 is referred to based on the target outlet temperature TAO calculated in Step S4, thereby calculating an upper limit number of revolutions Ncmtao based on the target outlet temperature TAO of the compressor 50. As illustrated in FIG. 7, the upper limit number of revolutions Ncmtao is calculated as a positive value that decreases as the target outlet temperature TAO decreases. Moreover, when the target outlet temperature TAO is low, the upper limit number of revolutions Ncmtao is calculated as a value less than any of the target numbers of revolutions Ncb1 to Ncb3.

In Step S96, the minimum value out of the target number of revolutions Ncb1 of the compressor 50 determined by the exterior temperature Tam and the thermal load imposed on the air-conditioning device 10, the target number of revolutions Ncb2 of the compressor 50 determined based on the flow amount of the air delivered by the blower 14, the target number of revolutions Ncb3 determined by the specification of the compressor 50, and the upper limit number of revolutions Ncmtao based on the target outlet temperature TAO is calculated as the first upper limit number of revolutions Ncm1 of the compressor 50. When the target outlet temperature TAO is low, the upper limit number of revolutions Ncm1 is the upper limit number of revolutions Ncmtao, and is thus less than the value calculated in Step S93.

Figure 8:
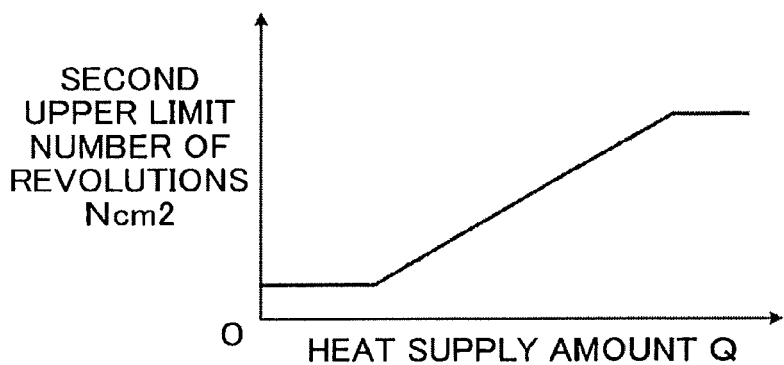
FIG. 8 is a map to be used to calculate a second upper limit number of revolutions Ncm2 of the compressor after the correction based on a heat supply amount Q to a heater core.

In Step S97, a heat supply amount Q (W·sec) to the heater core 18 is calculated based on the coolant temperature Tw, whether the electric water pump 72 is on or off, and the opening amount of the water valve 22. Further, a map illustrated in FIG. 8 is referred to based on the heat supply amount Q, thereby calculating the second upper limit number of revolutions Ncm2 of the compressor 50. As illustrated in FIG. 8, the second upper limit number of revolutions Ncm2 is calculated as a positive value that increases as the heat supply amount Q increases.

In Step S98, a lower limit guard number of revolutions of the compressor 50 set in advance is denoted by Ncm in (positive constant), and a larger one of the first upper limit number of revolutions Ncm1 and the lower limit guard number of revolutions Ncmin is calculated as a corrected first upper limit number of revolutions Ncm1a.

In Step S99, an upper limit number of revolutions Ncm of the compressor 50 is calculated as a sum of the corrected first upper limit number of revolutions Ncm1a and the second upper limit number of revolutions Ncm2 in accordance with Expression (2).

$$Ncm=Ncm1a+Ncm2 \quad (1)$$

In Step S100, whether or not the basic target number of revolutions Nc of the compressor 50 calculated in Step S91 is more than the upper limit number of revolutions Ncm is determined. When a negative determination is made, in Step S101, the target number of revolutions Nct of the compressor 50 is set to the basic target number of revolutions Nc. When an affirmative determination is made, in Step S102, the target number of revolutions Nct of the compressor 50 is set to the upper limit number of revolutions Ncm. When Step S101 or Step S102 is completed, the calculation control for compressor target number of revolutions proceeds to Step S10.

<Target Evaporator Temperature Calculation Routine>

Figure 6:
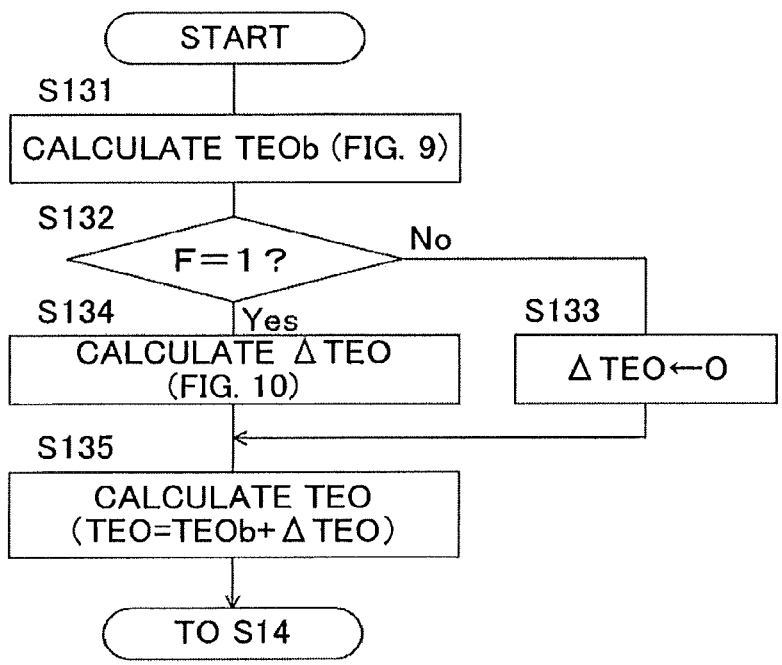
FIG. 6 is a flowchart for illustrating a target evaporator temperature calculation routine to be carried out in Step S13 of the flowchart illustrated in FIG. 3.

Referring to a flowchart illustrated in FIG. 6, a description is now given of a target evaporator temperature TEO calculation routine executed in Step S13. In the following description, the control in accordance with the flowchart illustrated in FIG. 6 is referred to as target evaporator temperature calculation control.

Figure 9:
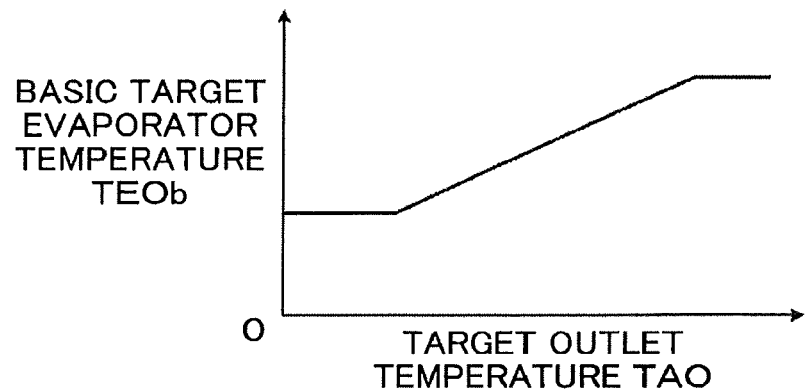
FIG. 9 is a map to be used to calculate a basic target evaporator temperature TEOb of an evaporator temperature TE based on the target outlet temperature TAO.

First in Step S131, a map illustrated in FIG. 9 is referred to based on the target outlet temperature TAO calculated in Step S4, thereby calculating a basic target evaporator temperature TEOb of the evaporator temperature TE. As illustrated in FIG. 9, the basic target evaporator temperature TEOb is calculated respectively as a low temperature and a high temperature in an extremely low temperature region and an extremely high temperature region of TAO, and is calculated so as to increase as TAO increases in a medium temperature region of TAO. The basic target evaporator temperature TEOb of the map illustrated in FIG. 9 is set so as to be a temperature equal to or less than a dew point temperature of the air flowing into the evaporator 48.

In Step S132, a determination of whether or not the flag F is 1, namely, a determination of whether or not the opening amount of the water valve 22 is decreased is made. When an affirmative determination is made, the target evaporator temperature calculation control proceeds to Step S134. When a negative determination is made, in Step S133, a correction amount ΔTEO described later to the basic target evaporator temperature TEOb is set to 0, and then, the target evaporator temperature calculation control proceeds to Step S135.

Figure 10:
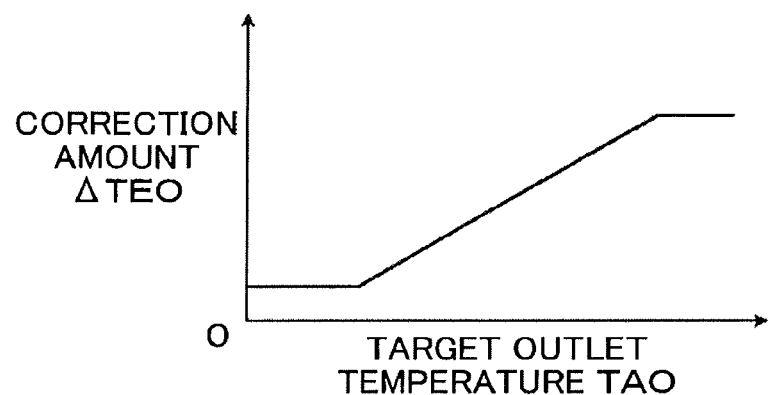
FIG. 10 is a map to be used to calculate a correction amount ΔTEO to the basic target evaporator temperature TEOb based on the target outlet temperature TAO.

In Step S134, a map illustrated in FIG. 10 is referred to based on the target outlet temperature TAO calculated in Step S4, thereby calculating the correction amount ΔTEO to the basic target evaporator temperature TEOb. As illustrated in FIG. 10, the correction amount ΔTEO is calculated as a positive value that increases as the target outlet temperature TAO increases.

In Step S135, the target evaporator temperature TEO is calculated as a sum of the basic target evaporator temperature TEOb and the correction amount ΔTEO in accordance with Expression (3), and the calculation control for compressor target number of revolutions proceeds to Step S14.

$$TEO=TEOb+\Delta TEO \quad (3)$$

As appreciated from the description given before, according to the embodiment, the air-conditioning control is carried out in Step S2 to Step S14 of the flowchart illustrated in FIG. 3, and the opening amount (including the full closure) of the water valve 22 is controlled in Step S21 to Step S29 of the flowchart illustrated in FIG. 4.

In particular, when the affirmative determination is made in Step S21 to Step S25, in other words, when the following conditions a to e are satisfied, in Step S28, the flag F is set to 1, and in Step S29, the opening amount of the water valve 22 is decreased.

a. The air-conditioning switch 88a is on (Step S21).
b. The vehicle cabin temperature setting switch is set to the minimum temperature for the cooling (Step S22).
c. The outlet opening mode is a mode other than the defroster mode (Step S23).
d. The coolant temperature Tw is equal to or less than α° C., and the intake air temperature Ta of the engine EG is equal to or less than β° C. (Step S24).
e. The signal requiring the decrease in the opening amount of the water valve 22 or the closure of the water valve 22 is input from the engine control device 90 (Step S25).

When the flag F is set to 1, the affirmative determination is made in Step S92 of the flowchart illustrated in FIG. 5. In Step S95, the upper limit number of revolutions Ncmtao based on the target outlet temperature TAO is calculated based on the target outlet temperature TAO, and in Step S96, the minimum value of the target numbers of revolutions Ncb1 to Ncb3 and the upper limit number of revolutions Ncmtao is calculated as the first upper limit number of revolutions Ncm1. In this case, the upper limit number of revolutions Ncmtao is calculated as a value less than at least one of the target numbers of revolutions Ncb1 to Ncb3.

Then, in Step S97, the second upper limit number of revolutions Ncm2 is calculated based on the heat supply amount Q to the heater core 18, and in Step S98, a value of larger one of the first upper limit number of revolutions Ncm1 and the lower limit guard number of revolutions Ncmin is calculated as the corrected first upper limit number of revolutions Ncm1a. Further, in Step S99, the upper limit number of revolutions Ncm of the compressor 50 is calculated as the sum of the corrected first upper limit number of revolutions Ncm1a and the second upper limit number of revolutions Ncm2.

Thus, compared with a case where the first upper limit number of revolutions Ncm1 is calculated without considering the upper limit number of revolutions Ncmtao, the first upper limit number of revolutions Ncm1 is a small value, and the upper limit number of revolutions Ncm is thus a small value. Thus, the upper limit value of the number of revolutions of the compressor 50 for bringing the temperature of the air blown out from the outlet openings 42 to 44 to the target outlet temperature TAO can be decreased, and energy consumed by the operation of the compressor 50 can be saved, and the fuel consumption of the vehicle can be decreased.

In particular, the upper limit number of revolutions Ncmtao is calculated as a positive value that decreases as the target outlet temperature TAO decreases, and the target number of revolutions Nct of the compressor 50 can thus be decreased as the target outlet temperature TAO decreases, in other words, as cooling performance required by the cooling device 16 increases. Thus, the number of revolutions of the compressor 50 can optimally be decreased in accordance with the cooling performance required by the cooling device 16 compared with a case where the upper limit number of revolutions Ncmtao is a constant value independently of the target outlet temperature TAO. Thus, the consumed energy can be decreased and the fuel consumption can be decreased without decreasing the air-conditioning performance of the air-conditioning device 10.

Further, when the flag F is set to 1, the affirmative determination is made in Step S132 of the flowchart illustrated in FIG. 6. In Step S134, the correction amount ΔTEO to the basic target evaporator temperature TEOb is calculated as a positive value that increases as the target outlet temperature TAO increases. Then, in Step S135, the target evaporator temperature TEO is calculated as a value acquired by adding the correction amount ΔTEO to the basic target evaporator temperature TEOb.

Thus, the target evaporator temperature TEO is increased by the amount of the correction amount ΔTEO compared with a case where the target evaporator temperature TEO is calculated so as to be the basic target evaporator temperature TEOb without adding the correction amount ΔTEO, and the cooling performance required by the cooling device 16 is thus decreased. Thus, the number of revolutions of the compressor 50 for bringing the temperature of the air having passed through the evaporator 48 of the cooling device 16 to the target evaporator temperature TEO can be decreased, and the energy consumed by the operation of the compressor 50 can be saved, and the fuel consumption of the vehicle can be decreased.

In particular, the correction amount ΔTEO is calculated as a positive value that increases as the target outlet temperature TAO increases, and the target evaporator temperature TEO can thus be increased as the target outlet temperature TAO increases, in other words, as cooling performance required by the cooling device 16 decreases. Thus, the number of revolutions of the compressor 50 can optimally be decreased in accordance with the cooling performance required by the cooling device 16 compared with a case where the upper limit number of revolutions Ncmtao is a constant value independently of the target outlet temperature TAO. Thus, regarding the number of revolutions of the compressor 50 as well, the consumed energy can be decreased and the fuel consumption can be decreased without decreasing the air-conditioning performance of the air-conditioning device 10.

Further, according to the embodiment, when the flag F is set to 1 and the opening amount of the water valve 22 is thus decreased, the first upper limit number of revolutions Ncm1 is decreased, thereby decreasing the upper limit number of revolutions Ncm and decreasing the target evaporator temperature TEO. Thus, compared with a case where only one of the decrease in the first upper limit number of revolutions Ncm1 and the decrease in the target evaporator temperature TEO is carried out, the energy consumed by the operation of the compressor 50 can effectively be saved, and the fuel consumption of the vehicle can reliably be decreased.

The specific embodiment of the present disclosure is described in detail above. However, the present disclosure is not limited to the embodiment described above. It is apparent to those skilled in the art that various other embodiments may be employed within the scope of the present disclosure.

For example, according to the embodiment, in Step S92 to Step S99, the first upper limit number of revolutions Ncm1 is decreased, thereby decreasing the upper limit number of revolutions Ncm, and in Step S131 to Step S135, the target evaporator temperature TEO is decreased when the opening amount of the water valve 22 is decreased. However, one of the decrease in the upper limit number of revolutions Ncm and the decrease in the target evaporator temperature TEO may be omitted.

Moreover, according to the embodiment, in Step S96, the minimum value out of the target number of revolutions Ncb1 of the compressor 50 determined by the exterior temperature Tam and the thermal load imposed on the air-conditioning device 10, the target number of revolutions Ncb2 of the compressor 50 determined based on the flow amount of the air delivered by the blower 14, the target number of revolutions Ncb3 determined by the specification of the compressor 50, and the upper limit number of revolutions Ncmtao is calculated as the first upper limit number of revolutions Ncm1. However, any of the target numbers of revolutions Ncb1 to Ncb3 may be omitted, and conversely, a target number of revolutions other than the target numbers of revolutions Ncb1 to Ncb3 may be considered.

Moreover, according to the embodiment, the sequence of Step S2 to Step S14 of the main routine of the air-conditioning control by the air-conditioning control device 24 shown in FIG. 3 is an example, and the sequence of those steps may thus be corrected.

Moreover, according to the embodiment, the control of the opening amount of the water valve in accordance with the flowchart illustrated in FIG. 4 is carried out by the interrupt to the main routine of the air-conditioning control illustrated in FIG. 3. However, there may be made such a correction that Step S21 to Step S29 are carried out as a part of the main routine at an arbitrary stage after Step S3 and before Step S9.

Figure 11:
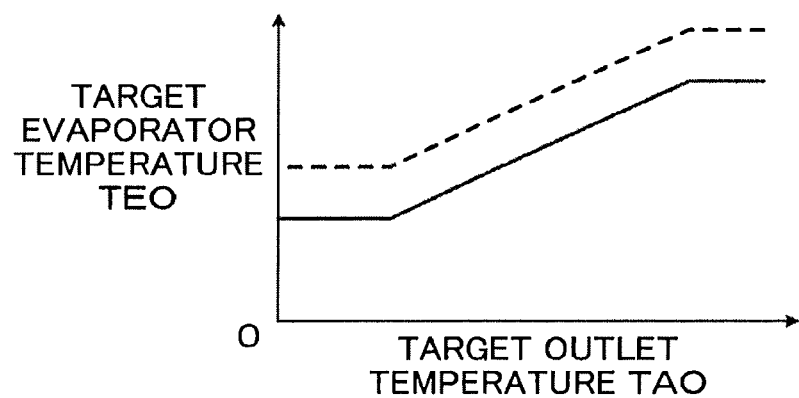
FIG. 11 is a map to be used to calculate the target evaporator temperature TEO based on the target outlet temperature TAO according to a modified example of the present disclosure.

Further, according to the embodiment, when the flag F is set to 1, in Step S134, the correction amount ΔTEO to the basic target evaporator temperature TEOb is calculated, and in Step S135, the target evaporator temperature TEO is calculated as the value acquired by adding the correction amount TEO to the basic target evaporator temperature TEOb. However, there may be made such a correction that the target evaporator temperature TEO is calculated from a map represented by the solid line of FIG. 11 when the flag F is 0, and is calculated from a map represented by the broken line of FIG. 11 when the flag F is 1.

What is claimed is:

1. An air-conditioning device for a vehicle, comprising:
a duct configured to feed air to a vehicle cabin;
a blower, which is arranged in the duct, and is configured to generate airflow toward the vehicle cabin;
a cooling device configured to cool air passing through the duct;
a coolant circulation system circulating engine coolant and including a water valve;
a heater core, which is arranged in the duct on a downstream side of the airflow with respect to the cooling device, arranged downstream of the water valve in the coolant circulation system, and configured to use the engine coolant supplied by the coolant circulation system as a heat source to heat the passing air;
an air mix damper configured to change a ratio between an air amount passing through the heater core and an air amount bypassing the heater core; and
a control device configured to control the blower, the cooling device, the air mix damper, and the water valve, wherein:
an opening amount of the water valve is changeable so as to be less than a fully open state;
the control device is configured to decrease the opening amount of the water valve so as to be less than the fully open state in a predetermined cooling mode and so as to decrease an amount of the engine coolant flowing to the heater core;
the control device is configured to decrease cooling performance of the cooling device in a case where the opening amount of the water valve is decreased compared with a case where the opening amount of the water valve is not decreased;
the cooling device includes an electric compressor configured to compress refrigerant to discharge the compressed refrigerant; and
the control device is configured to decrease the cooling performance of the cooling device through an increase in a target temperature and a decrease in an upper limit rotational speed of the electric compressor when the opening amount of the water valve is decreased,
wherein the upper limit rotational speed of the electric compressor is calculated based on each of a first upper limit number of revolutions of the compressor, a second upper limit number of revolutions of the compressor, and a corrected first upper limit number of revolutions of the compressor,
wherein the first upper limit is determined based on a minimum value out of 1) a target number of revolutions determined by an exterior temperature and a thermal load on the air-conditioning device, 2) a target number of revolutions based on a flow amount of air delivered by the blower, 3) a target number of revolutions based on a specification of the compressor, and 4) an upper limit number of revolutions based on a target outlet temperature,
wherein the second upper limit is determined based on a heat supply amount to the heater core,
wherein the corrected first upper limit number is determined based on a larger value of 1) the first upper limit and 2) a predetermined lower limit guard number of revolutions, and
wherein the upper limit rotational speed of the compressor is calculated as a sum of the corrected first upper limit number and the second upper limit number.

2. The air-conditioning device for a vehicle according to claim 1, wherein:
the cooling device comprises:
an evaporator, which is arranged in the duct on a downstream side of the airflow with respect to the blower, and is configured to evaporate the refrigerant sucked into the electric compressor; and
a condenser configured to condense the refrigerant evaporated by the evaporator; and
the control device is configured to control the electric compressor and the condenser so that a temperature of the evaporator reaches the target temperature.

3. The air-conditioning device for a vehicle according to claim 1, wherein the control device includes a vehicle cabin temperature setting switch, and the predetermined cooling mode includes a mode where the vehicle cabin temperature setting switch is set to a minimum temperature for cooling.

4. The air-conditioning device for a vehicle according to claim 1, wherein the duct includes a plurality of air outlet openings, a plurality of outlet opening modes can be set through settings of the air outlet openings, and the predetermined cooling mode includes a mode where the outlet opening mode is a mode other than a defroster mode.

5. The air-conditioning device for a vehicle according to claim 1, wherein the predetermined cooling mode includes a mode where a coolant temperature is equal to or less than a predetermined coolant temperature, and an intake air temperature of an engine is equal to or less than a predetermined intake air temperature.

6. An air-conditioning device for a vehicle, comprising:
a duct configured to feed air to a vehicle cabin;
a blower, which is arranged in the duct, and is configured to generate airflow toward the vehicle cabin;
a cooling device configured to cool air passing through the duct;
a coolant circulation system circulating engine coolant and including a water valve;
a heater core, which is arranged in the duct on a downstream side of the airflow with respect to the cooling device, arranged downstream of the water valve in the coolant circulation system, and configured to use the engine coolant supplied by the coolant circulation system as a heat source to heat the passing air;
an air mix damper configured to change a ratio between an air amount passing through the heater core and an air amount bypassing the heater core; and
a control device configured to control the blower, the cooling device, the air mix damper, and the water valve, wherein:
an opening amount of the water valve is changeable so as to be less than a fully open state;
the control device is configured to decrease the opening amount of the water valve so as to be less than the fully open state and larger than a fully closed state in a predetermined cooling mode;
the control device is configured to decrease cooling performance of the cooling device in a case where the opening amount of the water valve is decreased compared with a case where the opening amount of the water valve is not decreased;
the cooling device includes an electric compressor configured to compress refrigerant to discharge the compressed refrigerant; and
the control device is configured to decrease the cooling performance of the cooling device through an increase in a target temperature and a decrease in an upper limit rotational speed of the electric compressor when the opening amount of the water valve is decreased, wherein the upper limit rotational speed of the electric compressor is calculated based on each of a first upper limit number of revolutions of the compressor, a second upper limit number of revolutions of the compressor, and a corrected first upper limit number of revolutions of the compressor, wherein the first upper limit is determined based on a minimum value out of 1) a target number of revolutions determined by an exterior temperature and a thermal load on the air-conditioning device, 2) a target number of revolutions based on a flow amount of air delivered by the blower, 3) a target number of revolutions based on a specification of the compressor, and 4) an upper limit number of revolutions based on a target outlet temperature, wherein the second upper limit is determined based on a heat supply amount to the heater core, wherein the corrected first upper limit number is determined based on a larger value of 1) the first upper limit and 2) a predetermined lower limit guard number of revolutions, and wherein the upper limit rotational speed of the compressor is calculated as a sum of the corrected first upper limit number and the second upper limit number.

* * * * *